INVENTORS
ROBERT G.GLENN
TSOY K.MOY.

INVENTORS
ROBERT G. GLENN,
TSOY K. MOY.

United States Patent Office 2,971,327
Patented Feb. 14, 1961

2,971,327

DISCHARGE CONTROL OF AN OVEREXPANDING PROPULSION NOZZLE

Tsoy K. Moy, San Jose, Calif., and Robert G. Glenn, Merriam, Kans., assignors to Westinghouse Electric Corporation, East Pittsburgh, Pa., a corporation of Pennsylvania Filed Nov. 26, 1957, Ser. No. 699,055

2 Claims. (Cl. 60—35.6)

This invention relates to aviation jet propulsion engines, more particularly to exhaust nozzle structure employed therewith, and has for an object to provide improved exhaust nozzle structure of this type.

It is another object of the invention to provide an exhaust nozzle structure of the convergent-divergent type in which the effective cross-sectional area of the divergent portion of the nozzle is modified automatically in response to condition of the exhaust gases flowing therethrough, to prevent over-expansion of the gases and effect optimum nozzle efficiency during varying engine operating conditions including subsonic and supersonic flight conditions.

Briefly, in accordance with one embodiment of the invention there is provided, in an aviation jet propulsion engine such as a turbo-jet engine equipped with an afterburner, an exhaust nozzle structure of fixed tubular converging-diverging configuration adapted to control the expansion and acceleration of the exhaust gases ejected from the engine to the atmosphere, whereby to impart a propulsive thrust to the engine.

The exhaust nozzle is preferably formed of sheet metal and has inner and outer annular shells spaced from each other to form an annular gas flow passageway therethrough. The divergent portions of the inner and outer shells are provided with a series of annular rows of apertures within which are located small differential pressure piston bleed valves movable normal to the surfaces and controlling fluid flow through the apertures. The annular passageway is formed in such a manner that a portion of the exhaust gas is directed therethrough and the valves are formed in such a manner that as long as the pressure value of the expanding exhaust gases flowing through the nozzle is above that of the atmospheric pressure, the valves are maintained in the closed position. However, when the pressure value of the exhaust gases falls below that of the atmosphere, the valves move to the open position permitting gas to flow from the annular passageway into the nozzle in a series of jets, thereby preventing excessive expansion of the exhaust gases and, in effect, reducing the cross-sectional area of the nozzle.

In addition to the above structure, there is also provided means for modulating the throat area of the nozzle through a large range. This variation may be effected by means of a conical plug member disposed along the central axis of the nozzle and movable axially relative to the nozzle, in a manner well known in the art.

In another embodiment of the invention, the nozzle is formed with a series of annular rows of apertures within which are received movable differential pressure piston members having plates or dams formed at the inner ends thereof and projectable through the apertures into the divergent flow area of the exhaust nozzle. These piston members operate in a manner similar to that described in conjunction with the first embodiment so that, when the pressure value of the gases flowing through the exhaust nozzle is below that of the atmospheric pressure, the piston members are moved radially inwardly in a manner to project the plates into the divergent flow area of the exhaust nozzle, thereby to reduce the effective cross-sectional area of the nozzle. When the pressure of the exhaust gases rises above that of the atmosphere, the piston members are moved in radially outwardly direction thereby to move the plates out of the flow area of the exhaust nozzle.

In both embodiments the piston members are automatically modulated within their limits by the pressure differential between the gases undergoing expansion in the nozzle and the atmosphere, so that the nozzle structure operates at the maximum efficiency regardless of the operating condition of the engine. Also, the piston members are operable during an afterburning period as well as during a non-afterburning period.

The foregoing and other objects are effected by the invention as will be apparent from the following description and claims taken in connection with the accompanying drawings, forming a part of this application, in which:

Figure 1:
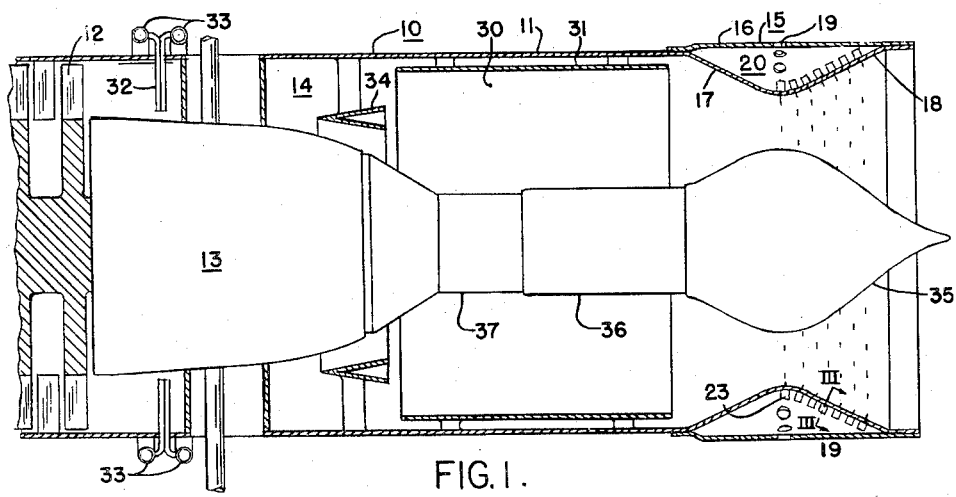
Fig. 1 is an axial sectional view of the aft end of an afterburning aviation jet engine having an exhaust nozzle made in accordance with the invention, the engine being shown in the non-afterburning position.

Referring to the drawing in detail, especially Figs. 1 through 4, there is shown an aviation jet propulsion engine 10 of any suitable type having the invention incorporated therein. Since the engine does not form a part of the invention, only the aft end thereof has been shown and only those portions essential for comprehension of the invention will be described. The engine is provided with a tubular casing 11 of elongated form housing a gas turbine including a bladed rotor 12 and having a centrally located fairing member 13 disposed downstream thereof. The fairing member 13 and the casing 11 jointly define an annular passageway 14 for the flow of hot motive gases expanded by the rotor 12.

An exhaust nozzle structure 15 is provided at the downstream end of the casing 11 for ejecting the gases to the atmosphere in the form of a propulsive jet, as well known in the art.

According to the invention, the exhaust nozzle 15 is of annular shape and is provided with an outer cylindrical shell member 16 and an inner tubular shell member 17 of V-shaped cross section having a diverging portion 18, as shown in Fig. 1, thereby to impart a converging-diverging shape to the nozzle structure 15. The outer shell is provided with a plurality of apertures 19 and the inner shell 17 is attached to the outer shell 16 at the upstream and downstream ends to provide an annular space 20 communicating with the atmosphere through the apertures 19. Hence, it will be understood that the space 20 is at atmospheric air pressure values during all conditions of operation of the engine.

Figure 2:
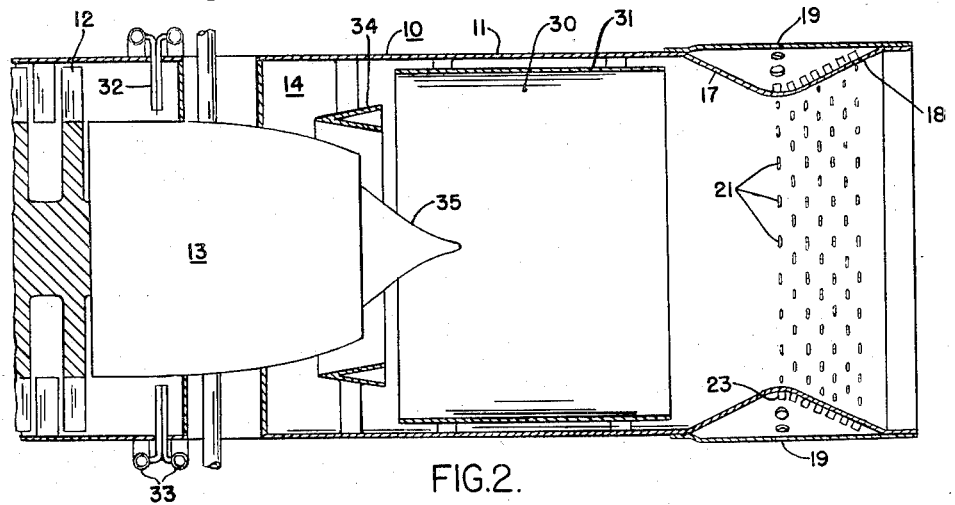
Fig. 2 is a view similar to Fig. 1 with the engine shown in the afterburning position.
Figure 3:
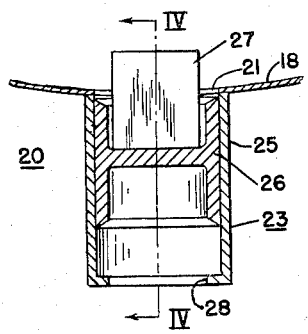
Fig. 3 is an enlarged fragmentary sectional view taken on line III—III of Fig. 1.
Figure 4:
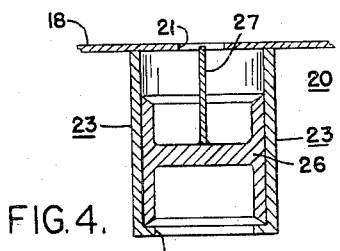
Fig. 4 is a sectional view taken on line IV—IV of Fig. 3.

The inner shell 17 is formed in its divergent portion 18 with a series of annular rows of apertures 21, as best shown in Fig. 2, and a differential pressure responsive mechanism 23 is mounted in registry with each of the apertures 21. Since the mechanisms 23 may all be identical, only one of the mechanisms has been shown in detail and will be further defined. The mechanism 23, as best shown in Figs. 3 and 4, is provided with a cylindrical housing 25 within which is slidably received a piston element 26 movable along an axis normal to the surface of the inner shell 17 and having a plate or dam 27 mounted thereon in registry with the aperture 21 and movable therethrough into and out of the exhaust gas flow area of the divergent portion 18 of the exhaust nozzle. The mechanism housing 25 is further provided with an aperture 28 communicating with the space 20, so that the mechanism is actuated in radially inwardly direction when the air pressure value in the space is larger than the gas pressure value in the exhaust area of the nozzle and, conversely, in radially outwardly direction when the pressure value of the gases undergoing expansion in the exhaust nozzle is larger than the atmospheric air pressure value in the space 20.

The engine casing 11 further forms an afterburner combustion chamber 30 which may be surrounded by a cylindrical liner member 31 suitably held within the casing 11. Fuel for the afterburner may be provided by a plurality of suitable injecting nozzles 32 disposed in the turbine exhaust gas passageway 14, forwardly of the afterburner combustion chamber 30, and fed by annular manifolds 33 connected to a suitable source of fuel (not shown). Also, in a manner well known in the art, flameholding apparatus 34 of any suitable type may be provided within the casing 11 for anchoring the combustion flame thereto during an afterburning period.

The fairing member 13 is provided with a conical or otherwise tapered plug member 35 slidably mounted to the end one of a plurality of telescoping, graduated cylinders 36 and 37 which may be actuated by suitable mechanism (not shown) disposed within the fairing 13 and operable to move the plug member 35 from the extended or non-afterburning position shown in Fig. 1 to the retracted or afterburning position shown in Fig. 2.

During a non-afterburning operation, the plug member 35 is extended as required into registry with the exhaust nozzle 15, as shown in Fig. 1, to reduce the effective throat area of the exhaust nozzle and thus to regulate the flow of exhaust gases from the turbine rotor 12 and the passageway 14 to the atmosphere in a smooth regulated propulsive jet. During non-afterburning with the engine operating within design conditions, the divergent surface of the inner shell 17 of the nozzle is generally effective to regulate the gas flow therethrough with optimum pressure drop in an efficient manner. However, should the pressure of the exhaust gases fall below that of the atmosphere, for any reason such as operation of the engine under conditions below design values, indicating an overexpanding condition of the gases in the divergent nozzle portion 18, the piston members 26 are actuated by the relatively higher pressure of the atmospheric air within the space 20 to move the dams 27 radially inwardly, thereby reducing the effective area and contour of the diverging nozzle portion 18. Obviously, since the differential pressure mechanisms are independent of each other they will independently assume the positions at which optimum efficiency of the nozzle structure 15 is attained.

Conversely, should the pressure value of the exhaust gases rise above that of the atmosphere, the piston members 26 are actuated in radially outwardly direction, thereby moving the dams out of the divergent flow area of the exhaust nozzle and rendering the entire area of the exhaust nozzle effective to control the expansion of the gases.

During an afterburning operation, the plug member 35 is disposed in the position shown in Fig. 2, wherein it is nested within the fairing member structure 13, thereby increasing the throat area of the exhaust nozzle structure 15 to the maximum, in order to accommodate the increased flow of gases formed by combustion of the fuel being injected into the afterburner by the fuel injectors 32. During afterburning, as well known in the art, the fuel injected by the injectors 32 is vaporized within the passageway 14 and ignited, the flame of combustion anchoring on the flameholders 34 and the gases formed thereby augmenting the gas flow from the engine to increase the volume and velocity of the gases ejected by the exhaust nozzle structure 15.

During an afterburning operation, the pressure value of the gases in the divergent nozzle portion 18 may fall below that of the atmosphere, in a manner similar to that outlined in connection with the non-afterburning operation, and the mechanisms 23 are actuated in a similar manner to modify the effective cross-sectional area and/or divergent contour of the divergent nozzle portion 18, thereby to permit gas flow through the nozzle to be effected at maximum efficiency.

In Figs. 5 through 8 there is shown a second embodiment of the invention. Since in connection with the illustrations showing the second embodiment, considerable structure has been shown which has been heretofore described in conjunction with the first embodiment, the same numerals will be utilized in conjunction therewith and only that structure which has been modified will be specifically described.

Figure 5:
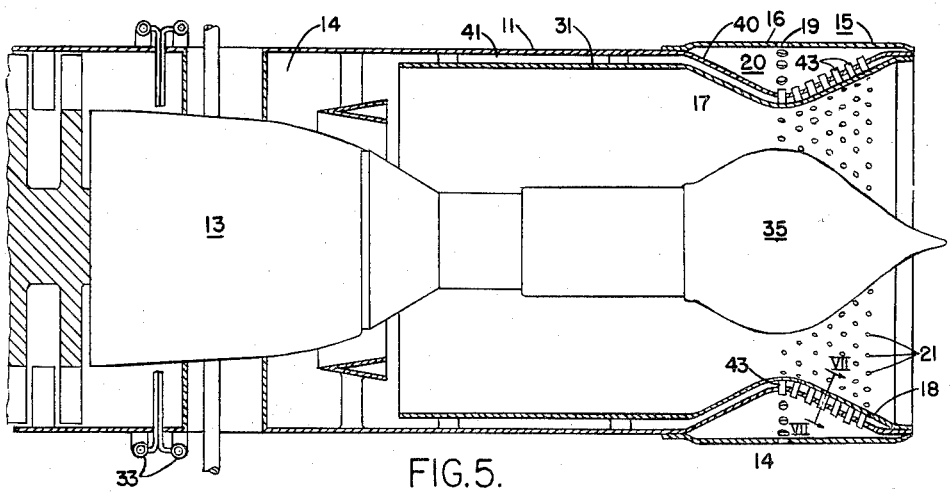
Fig. 5 is an axial sectional view of the aft end of an aviation jet engine similar to the one shown in Figs. 1 and 2, but having an exhaust nozzle forming a second embodiment of the invention, the engine being shown in the non-afterburning position.
Figure 6:
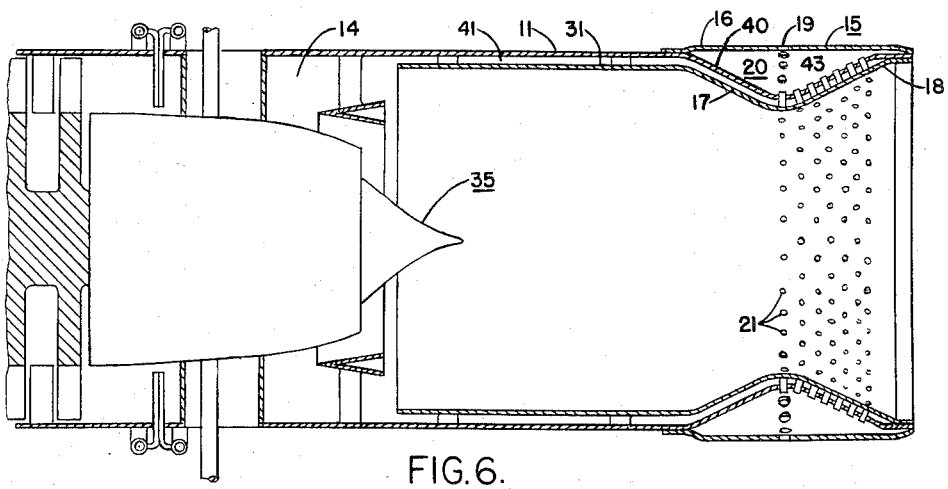
Fig. 6 is a view similar to Fig. 5 but showing the engine in the afterburning position.
Figure 7:
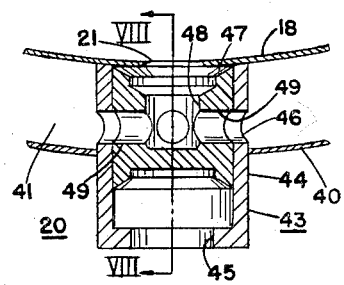
Fig. 7 is an enlarged sectional view taken on line VII—VII of Fig. 5.
Figure 8:
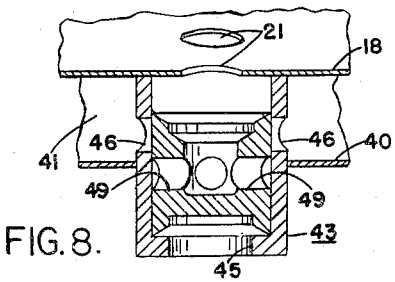
Fig. 8 is a sectional view taken on line VIII—VIII of Fig. 7.

The exhaust nozzle structure 15, illustrated in Figs. 5 and 6, has an outer cylindrical shell 16 and an inner cylindrical shell 17 formed with a V-shaped cross-section and having a series of apertures 21 formed in the divergent portion 18 thereof. The inner shell 17 may be integral with or joined to the combustion chamber liner member 31 and a secondary shell member 40, similar in shape to the shell 17, is disposed intermediate the inner shell 17 and the outer shell 16. Thus, as shown in Figs. 5 and 6, the liner member 31 and the engine casing 11 jointly form an annular passageway 41 communicating at its upstream end with the turbine exhaust passage 14, while the inner shell 17 and the intermediate shell 40 form a continuation of the passageway 41. The intermediate shell 40 and the outer shell 16 form an annular space 20 communicating with the atmosphere through an annular series of openings 19 provided in the latter.

Each of the apertures 21 in the divergent nozzle portion 18 is provided with a differential pressure valve mechanism 43 having a tubular housing 44 provided with an opening 45 at its outer end and having opposed apertures 46 disposed in communication with passageway 41. Within the housing 44 there is provided a slidable piston member 47 having a central bore 48 aligned with the aperture 21 and transverse bores 49 communicating with the bore 48. The slidable piston member 47 is proportioned in such a manner that when it is in the radially innermost position shown in Fig. 7, the bores 49 are disposed in alignment with the apertures 46, thereby to connect the passageway 41 with the flow area of the divergent nozzle portion 18 through the aperture 21, while when the piston member 47 is in the radially outermost position shown in Fig. 8, the apertures 46 are blocked by the piston member, thereby obviating flow therethrough.

The operation of the exhaust nozzle structure 15 shown in Figs. 5 through 8 is somewhat similar to that defined in conjunction with the first embodiment. Thus, when the pressure value of the gases flowing through the exhaust nozzle exceeds that of the atmosphere, the slidable piston member 47 is moved radially outwardly, thereby blocking the apertures 46. Conversely, when the pressure of the gases in the divergent nozzle portion 18 is lower than that of the atmosphere, the piston member 47 is moved radially inwardly, thereby aligning the apertures 46 and the bore 49 and allowing a portion of the pressurized hot gases flowing through the passageway 41 to be admitted through the aperture 21 into the gas flow passageway of the divergent nozzle portion 18 in the form of a jet. Thus, over-expansion of the exhaust gas stream in the exhaust nozzle is prevented and more efficient nozzle operation is attained.

The mechanisms are modulated by the specific pressure value prevailing adjacent thereto. Hence, the mechanisms in some of the rows may be open while the mechanisms in other rows may be fully or partly closed, thereby closely regulating the expansion of gas in all portions of the divergent portion of the exhaust nozzle and maintaining optimum operation thereof for all operating conditions of the engine.

It will now be seen that the invention provides exhaust nozzle structure for a jet propulsion engine which, though of fixed configuration, is self-adaptable to varying gas flow characteristics and controls the expansion of the gases from the throat of the nozzle to its outlet with a degree of precision otherwise not attainable with mechanically adjustable mechanisms.

While the invention has been shown in several forms, it will be obvious to those skilled in the art that it is not so limited, but is susceptible of various other changes and modifications without departing from the spirit thereof.

What is claimed is:

1. Motive fluid exhaust nozzle structure comprising a tubular casing defining a passageway for exhausting a hot pressurized gaseous fluid moving at a high velocity, annular shell structure communicating with said tubular casing and defining a divergent exhaust nozzle opening for ejecting said fluid to the ambient atmosphere, means for reducing the effective cross-sectional area of said exhaust nozzle opening including an annular array of apertures formed in said shell structure, a plurality of valves attached to said shell structure for directing fluid through said apertures into said nozzle opening, each of said valves comprising a tubular housing disposed in registry with its associated aperture and a piston member slidably disposed in said housing for movement normal to said shell structure, said piston members being responsive to the differential pressure between the gaseous fluid in the exhaust nozzle opening directed through said apertures and the atmospheric air surrounding said casing, said tubular housings and piston members being provided with openings and said piston members being individually movable in a direction to effect movement of the fluid into said nozzle opening through said apertures when the pressure of the gaseous fluid in the nozzle opening is lower than that of the atmospheric air, thereby to prevent over-expansion of the gaseous fluid in said exhaust nozzle opening.

2. Motive fluid exhaust nozzle structure comprising a tubular casing defining a flow passageway for a heated pressurized gaseous fluid, a rigid annular shell member communicating with said tubular casing and defining a fixed exhaust nozzle having a restricted throat portion and a radially diverging exhaust outlet portion for controlling the expansion of and ejecting said fluid to the atmosphere, means including an axially movable plug member for reducing the cross-sectional area of said throat portion, means for reducing the effective cross-sectional area of said diverging exhaust outlet portion including annular conduit structure for conveying a portion of said heated pressurized fluid, said shell member having a plurality of apertures formed therein affording a communication between said conduit structure and the region defined by said diverging portion, and a plurality of pressure responsive valves operatively associated with said conduit structure for controlling the flow of pressurized fluid into said region, each of said valves comprising a tubular housing having an aperture communicating with said conduit structure and a piston slidably disposed in said housing for controlling flow of fluid through the aperture in said housing and the associated aperture in said shell member, said piston member being responsive to the differential pressure between the gaseous fluid in said region and the atmosphere, each said piston member being individually movable in a direction to permit flow of the pressurized fluid into said region when the pressure of the gaseous fluid in said region is below that of the atmosphere and to terminate such flow when the gaseous fluid pressure is above that of the atmosphere.

References Cited in the file of this patent

UNITED STATES PATENTS

| | | |
|---|---|---|
| 2,537,772 | Lundquist et al. | Jan. 9, 1951 |
| 2,569,996 | Kollsman | Oct. 2, 1951 |
| 2,570,629 | Anxionnaz et al. | Oct. 9, 1951 |
| 2,703,959 | Wetherbee | Mar. 15, 1955 |
| 2,858,668 | Kelley et al. | Nov. 4, 1958 |

FOREIGN PATENTS

| | | |
|---|---|---|
| 1,110,011 | France | Oct. 5, 1955 |
| 1,124,348 | France | June 25, 1956 |
| | (Corresponding to Great Britain No. 795,652, May 28, 1958) | |
| 654,344 | Great Britain | June 13, 1951 |
| 745,697 | Great Britain | Feb. 29, 1956 |